(12) United States Patent
Burkey et al.

(10) Patent No.: US 6,497,366 B1
(45) Date of Patent: Dec. 24, 2002

(54) METHODS AND APPARATUS FOR DUAL CHANNEL VIDEO RECOVERY IN BAR CODE SCANNERS

(75) Inventors: John K. Burkey, Duluth, GA (US); Barry M. Mergenthaler, Lawrenceville, GA (US); Hong Tang, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/001,368

(22) Filed: Dec. 31, 1997

(51) Int. Cl.[7] ............... G02B 26/10; G06K 7/10; G06K 9/22; G06K 19/06
(52) U.S. Cl. .................. 235/462.25; 235/462.29
(58) Field of Search .............. 235/454, 462.01, 235/462.08, 462.25, 462.27, 462.02, 462.15, 462.18, 462.23, 462.4, 462.41, 436, 462.29

(56) References Cited

U.S. PATENT DOCUMENTS

| 5,278,397 A | | 1/1994 | Barkan et al. ............ 235/462 |
|---|---|---|---|
| 5,298,728 A | * | 3/1994 | Elliot et al. ............ 235/462.27 |
| 5,311,002 A | * | 5/1994 | Kamezawa et al. .... 235/462.27 |
| 5,332,892 A | | 7/1994 | Li et al. .................... 235/462 |
| 5,357,094 A | | 10/1994 | Baldwin .................... 235/494 |
| 5,361,158 A | * | 11/1994 | Tang ........................ 235/462.4 |
| 5,404,002 A | | 4/1995 | Tang ......................... 235/462 |
| 5,506,392 A | | 4/1996 | Barkan et al. ............ 235/472 |
| 5,528,022 A | * | 6/1996 | Nakazawa ................. 235/436 |
| 5,552,592 A | | 9/1996 | Dvorkis et al. ............ 235/462 |
| 5,612,531 A | | 3/1997 | Barkan ...................... 235/462 |
| 5,701,001 A | | 12/1997 | Sugifune et al. .......... 235/472 |
| 5,708,261 A | * | 1/1998 | Chen ..................... 235/462.18 |
| 6,073,849 A | * | 6/2000 | Colley et al. .......... 235/462.27 |
| 6,220,513 B1 | * | 4/2001 | Blanford et al. ....... 235/462.15 |
| 6,347,741 B1 | * | 2/2002 | Blanford et al. ....... 235/462.02 |
| 6,394,351 B1 | * | 5/2002 | Keys et al. ............ 235/462.01 |
| 6,422,467 B2 | * | 7/2002 | Lucera et al. .......... 235/462.23 |
| 6,435,412 B2 | * | 8/2002 | Tsi et al. ............... 235/462.41 |
| 2002/0000466 A1 | * | 1/2002 | Lucera et al. .......... 235/462.01 |
| 2002/0000467 A1 | * | 1/2002 | Dorris et al. .......... 235/462.01 |
| 2002/0117548 A1 | * | 8/2002 | Keys et al. ............ 235/462.01 |

FOREIGN PATENT DOCUMENTS

| EP | 0460669 | | 12/1991 |
|---|---|---|---|
| EP | 0527267 | | 2/1993 |
| JP | 5-189590 A | * | 7/1993 |

* cited by examiner

Primary Examiner—Michael G. Lee
Assistant Examiner—Jared J. Fureman
(74) Attorney, Agent, or Firm—Priest & Goldstein, PLLC (57) ABSTRACT

A dual channel video data recovery system for use in a bar code scanner. A first and a second video signal are generated in parallel in response to light reflected from a bar code. The first and second video signals are received and filtered to limit their frequency ranges and produce filtered first and second video signals. The first and second filtered video signals are limited to different and preferably coverlapping frequency ranges. The first and second video signals have differing thresholds which may be dynamically varied. The first and second filtered video signals are converted to first and second digital data strings. If both strings contain useful data, the string containing the higher-quality data is decoded to recover bar code information. If only one string contains useful data, the string containing useful data is decoded.

23 Claims, 6 Drawing Sheets

METHODS AND APPARATUS FOR DUAL CHANNEL VIDEO RECOVERY IN BAR CODE SCANNERS

CROSS-REFERENCE TO RELATED APPLICATIONS

The present application makes reference to U.S. application Ser. Nos. 09/001,367 (now U.S. Pat. No. 6,220,513B1) and Ser. No. 09/001,369, entitled "Methods and Apparatus for Determining Bar Code Label Location Information", and "Methods and Apparatus for Enhanced Scanner Operation Employing Bar Code and Bar Code Fragment Time and Position of Data Collection", respectively, filed on even date herewith and assigned to the assignee of the present invention. These applications are incorporated by reference herein in their entirety. As discussed in greater detail below, in a presently preferred embodiment of the present invention, the teachings of the present invention are used in conjunction with the teachings of the above referenced applications.

FIELD OF THE INVENTION

The present invention relates generally to improvements in optical bar code scanners. More particularly, the invention relates to methods and apparatus for dual video channel data recovery and advantageous thresholding techniques which may be employed in conjunction therewith.

BACKGROUND OF THE INVENTION

Optical scanners, and especially bar code scanners, are in wide use in a variety of applications, and serve to increase the accuracy and efficiency of data acquisition wherever they are used. In typical use, a standardized bar code label is affixed to an object, the bar code carrying an identifying number for the object. The object is passed along a scan field, where the bar code reflects light emitted by a laser or other light source, and reflects the light back to a data acquisition channel. The data acquisition channel decodes the reflected pattern and uses the decoded information to retrieve data associated with the object.

Objects with bar code labels are typically moved across the scan field manually, at varying rates of speed. Further, the distance from the scanner window will typically vary from scan to scan. The further the label is from the window the higher the frequency in the captured signal for the bar code label. Therefore, the frequency of the light modulation captured by a scanner may vary from one scan to another, and even within the same scan. Moreover, it is desirable to be able to use bar code labels of varying sizes with the same scanner. The use of different-sized bar code labels also varies the frequency of the modulated light pattern captured by the capturing mechanism. It is therefore desirable to maximize the frequency range over which the data recovery of the bar code scanner operates.

Bar code labels are also subject to certain paper and printing imperfections, which cause interference with a successful scan. Labels with numerous imperfections are typically read at one threshold extreme or the other. For example, a high level of noise resulting from paper and printing imperfections may be thresholded out using a higher DC threshold level. However, the risk that is run is that this high threshold might also threshold out a weak signal for an actual bar code bar. On the other hand, for a low contrast bar code, where the background paper is rough and off white or the ink is not dark enough, a low threshold might be employed because a weak bar code signal would be likely. In this instance, noise or bar code imperfections exceeding the low threshold may be detected as bar code intervals. A variety of other scanning circumstances effect the appropriate choice of threshold, but, in short, a single threshold is not well suited to addressing all of the typical real world variations.

Bar code scanners of the prior art typically include a single data recovery channel with a limited frequency range and a single threshold which may have both a DC and an AC component. Noise is typically limited by a single bandpass filter. This increases the likelihood that a label with severe imperfections will require repeated attempts to scan, or will fail to scan altogether, as the imperfect label is more likely to produce a response that falls outside the acceptable frequency range.

There exists, then, a need in the art for a bar code scanner having dual data recovery channels which satisfactorily limit or filter out noise but which provide a broader frequency range sufficient to decode labels having imperfections which produce frequencies at one end of the range or the other. Further, it is highly desirable to have a dynamic thresholding arrangement which is adjusted in real time to adapt to observed scanning conditions as described further below.

SUMMARY OF THE INVENTION

A video data recovery system according to the teachings of the present invention preferably includes first and second video signal generators for generating first and second video signals in response to light recovered from the reflection from a bar code. The data recovery system further includes first and second video signal receivers for receiving the first and second video signals, and first and second filters for limiting the frequency range of each of the first and second video signals, thereby producing first and second filtered video signals. The first and second filters limit the first and second video signals to differing but overlapping frequency ranges. The first and second video signals have differing thresholds applied. The first and second filtered and thresholded video signals are furnished to first and second analog-to-digital converters, respectively, to produce first and second digital data strings. If both of the first and second digital data strings contain useful data, the string containing higher-quality data is decoded to recover the bar code information. If only one of the first and second digital data strings contains useful data, that string is decoded. Further, the thresholds may advantageously set to aggressively threshold on one channel and to less aggressively threshold on the other channels with dynamic threshold adjusts being possible to adapt to the scan environment.

A more complete understanding of the present invention, as well as further features and advantages of the invention, will be apparent from the following Detailed Description and the accompanying drawings.

DETAILED DESCRIPTION

Figure 1A:
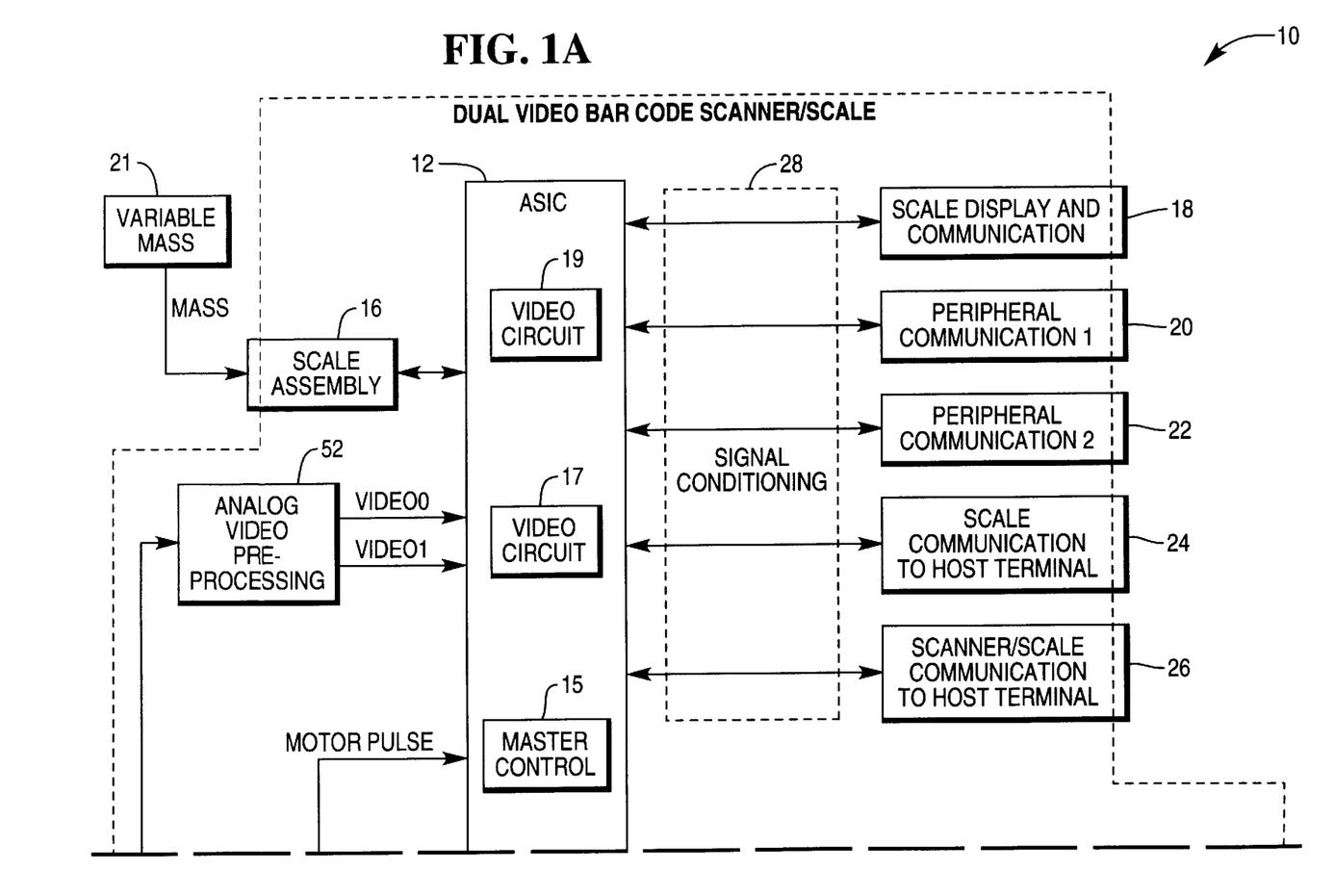
FIGS. 1A and 1B illustrate a bar code scanner incorporating a dual video channel data recovery system according to the present invention.
Figure 1B:
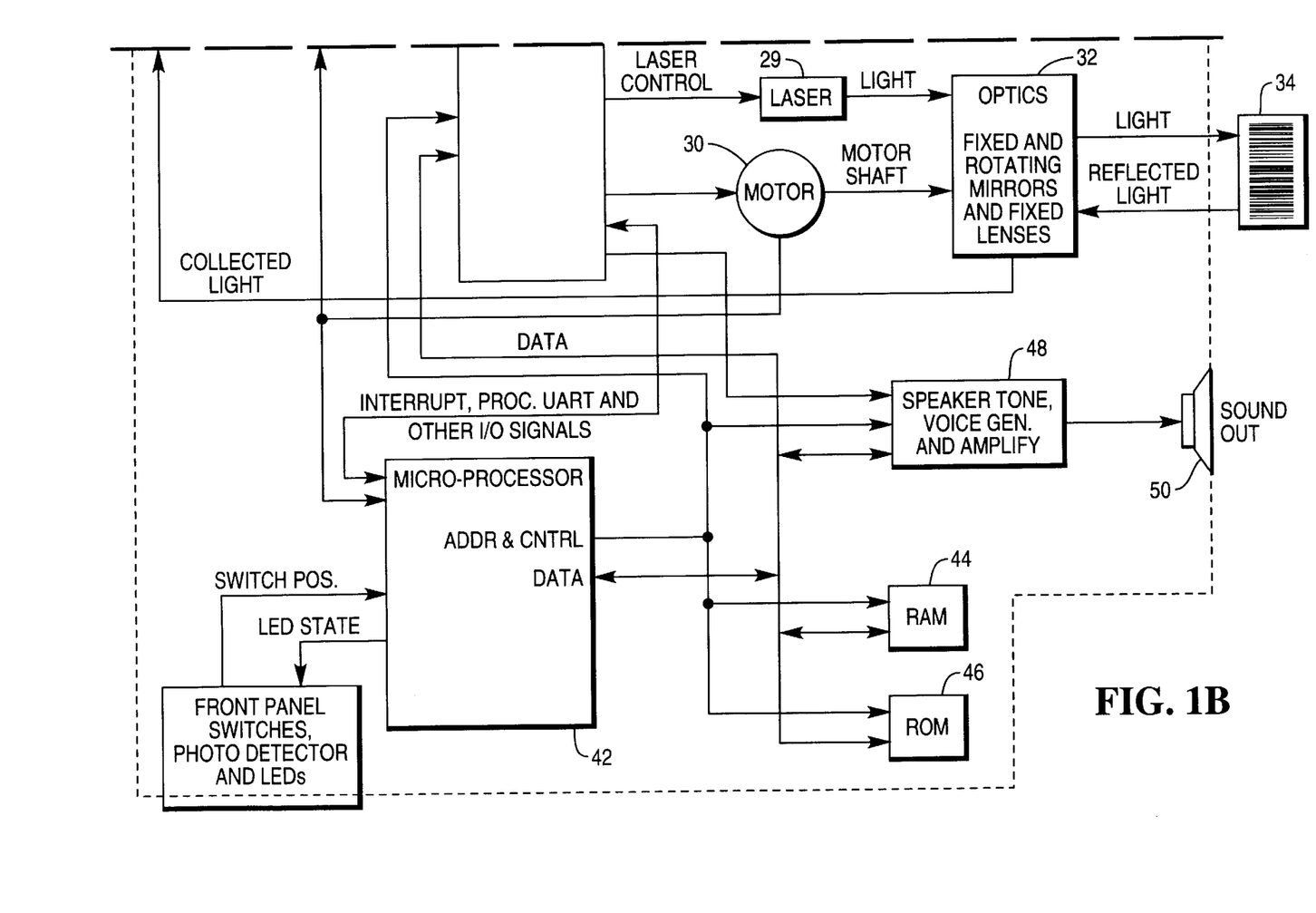

FIGS. 1A and 1B are a diagram illustrating a bar code scanner 10 incorporating the use of a parallel video channel data recovery system according to the teachings of the present invention. The bar code scanner 10 includes an ASIC 12. ASIC 12 includes master control circuit 15, first video circuit 17 and second video circuit 19, discussed in greater detail in connection with FIG. 2 below. The illustrated bar code scanner 10 also includes a scale assembly 16 on which an object such as variable mass 15 may be placed for weighing, scale assembly 16 then supplying weight information to ASIC 12. In a presently preferred embodiment, the present invention is implemented in a bar code scanner, such as the NCR model 7875 scanner, in conjunction with the teachings of U.S. application Ser. Nos. 09/001,367 (now U.S. Pat. No. 6,220,513 B1) and Ser. No. 09/001,369 entitled "Methods and Apparatus for Determining Bar Code Label Location Information" and "Methods and Apparatus for Enhanced Scanner Operation Employing Bar Code and Bar Code Fragment Time and Position of Data Collection". It will be recognized that the present invention may also be utilized with a wide variety of scanners and without the various improvements of the previously referred to related applications.

Bar code scanner 10 also includes a scale display and communication circuit 18, first peripheral communication circuit 20, second peripheral communication circuit 22, scale communication to host terminal circuit 24, and scanner/scale communication to host terminal circuit 26, each of circuits 18–26 furnishing signals to ASIC 12, the signal from each of circuits 18–26 first passing through line conditioner 28. ASIC 12 also furnishes a laser control signal to a laser 29, and also furnishes commands to a motor 30. The motor 30 includes a motor shaft 30a. An optical assembly 32, including fixed and rotating mirrors and fixed lenses (not shown in detail) directs laser light to the scan field of the scanner 10. As the motor 30 is driven in response to signals from the ASIC 12, the moving portion of optical assembly 32 which is mounted on a spinner is moved by motor 30. As light is emitted from laser 29, the light is directed by the optical assembly 32 to strike a bar code label 34 whenever a bar code label 34 is present within the field of view.

When light strikes bar code label 34, the light is reflected back to optical assembly 32 and collected by optical assembly 32 and passed to an analog video preprocessing circuit 52, which provides VIDEO0 and VIDEO1 signals to ASIC 12.

Bar code scanner 10 also includes a microprocessor 42. Interrupt, Processing, UART and other I/O signals are passed between the ASIC 12 and the microprocessor 42. Bar code scanner 10 further includes input/output package 40, which includes front panel switches, photodetector and LEDs. The microprocessor 42 can accept settings from the front panel switches by receiving a switch position signal from the input/output package 40. The microprocessor sets the states of the LEDs on input/output package 40 by transmitting an LED state signal to the input/output package 40.

Bar code scanner 10 also includes capabilities for sound generation, including sound output circuit 48, speaker 50, automatic volume adjustment circuit 36 and microphone 38. These capabilities may be utilized for a variety of purposes including providing operator feedback. Bar code scanner 10 also includes RAM and ROM memory 44 and 46, respectively.

A data bus passes between ASIC 12, microprocessor 42, RAM memory 44, ROM memory 46 and sound output circuit 48. An address and control bus also passes between ASIC 12, microprocessor 42, RAM memory 44, and ROM memory 46.

Bar code reader 10 produces tones and generated voice sounds in order to communicate with the operator. Sound output circuit 48 receives signals from ASIC 12 and microprocessor 42 for instructions on what sounds to generate and when, and accesses data from RAM 44 and ROM 46 for the generation of sounds. The sounds are passed to speaker 50.

The motor 30 drives the rotating portion of the optical assembly 32. The motor preferably includes a Hall effect device, which produces a fixed number of pulses each time the motor is rotated one revolution. The pulses are transmitted to the ASIC 12 and the microprocessor 42 in the form of a motor pulse signal. The ASIC 12 and the microprocessor 42 are able to use the motor pulse signal to synchronize the count of an accurate elapsed clock time to motor position and event occurrence. While a Hall effect sensor is presently preferred, it is contemplated that other position sensing mechanisms might be utilized.

Figure 2:
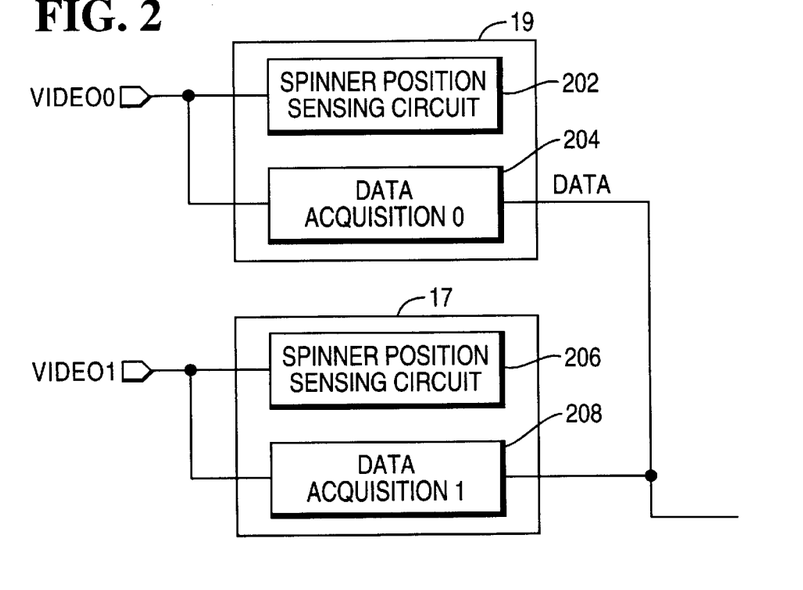
FIG. 2 is a detailed illustration of each of two parallel video circuits according to the present invention.

FIG. 2 is a diagram illustrating additional details of video circuit 17 and video circuit 19 of ASIC 12. Video circuits 17 and 19 operate in parallel, receiving video data from analog video processor 52. Video circuit 17 includes a spinner position sensing circuit 202 and a data acquisition circuit 204. Video circuit 19 includes a spinner position sensing circuit 206 and a data acquisition circuit 208. Video circuits 17 and 19 receive the signals VIDEO0 and VIDEO1, respectively. The signals VIDEO0 and VIDEO1 are generated by the analog video preprocessing circuit 52, which receives recovered light reflected from bar code 34. The analog video preprocessing circuit 52 produces analog video signals VIDEO0 and VIDEO1 which are produced as described further below, and furnishes the signals to video circuit 17 and video circuit 19, respectively. Video circuit 19 routes the signal VIDEO0 to spinner position sensing circuit 202 and data acquisition circuit 204. Video signal circuit 17 routes the signal VIDEO1 to spinner position sensing circuit 206 and data acquisition circuit 208. Data acquisition circuits 204 and 208 extract data from the signals VIDEO0 and VIDEO1, respectively, and place the data on the data bus 43, where it is made available to microprocessor 42, and also made available for storage in RAM 44.

The analog video signals from which VIDEO0 and VIDEO1 are derived both have signal and noise components, with most of the noise in each signal occurring at the extremes of the frequency range of the signal, while the center of the frequency range experiences relatively little noise. By providing two channels to process the raw analog video input, each employing a separate video signal and separate thresholds, a data recovery system according to the present invention is able to cover a wider frequency range and a wider range of signal amplitudes, while still filtering out the extreme, and therefore noise-prone, frequencies of each signal. A variety of processing advantages flow from this wider range of coverage. For example, bar code labels with widely differing amount of "paper noise" may be discriminated with aggressive thresholding on the first channel and labels with low contrast may be read by a less aggressive threshold on the second channel. Further, when coupled with label position data, the decoding processor can determine which channel to employ in part based upon the position data.

Figure 3:
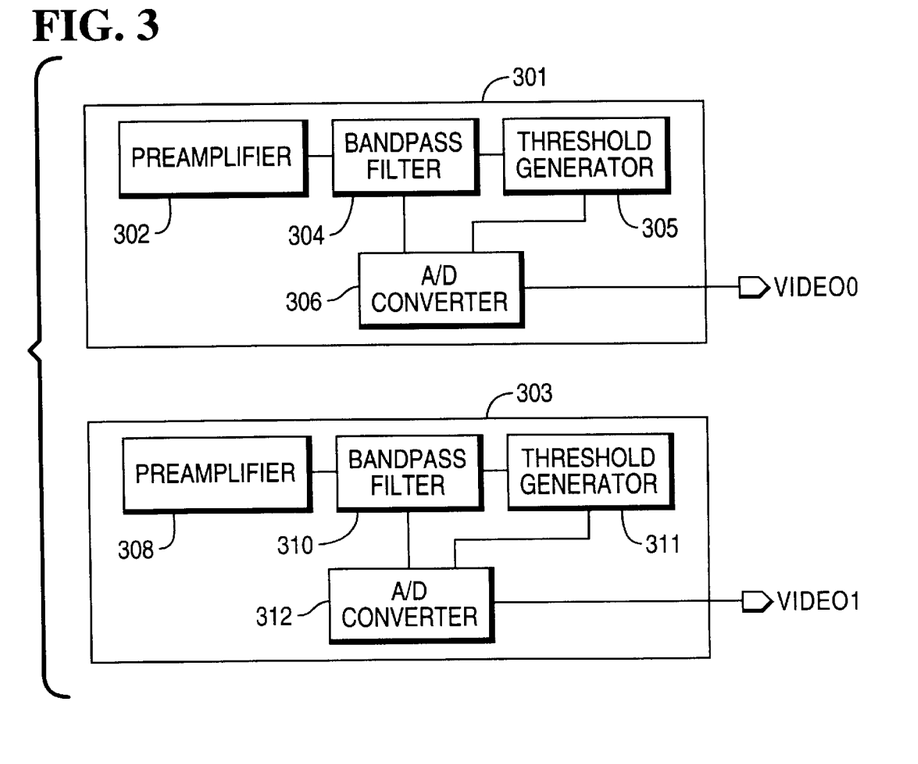
FIG. 3 is a detailed illustration of each of two parallel video data acquisition circuits according to the present invention.

FIG. 3 illustrates additional details of video processing circuits 301 and 303 which are part of the analog video processor 52. Video processing circuit 301 includes a preamplifier 302 for amplifying the photodetector output, a bandpass filter 304 for filtering out frequency extremes, threshold generator 305, and an analog-to-digital converter 306, for converting the filtered and thresholded analog signal to the digital signal VIDEO0 which can be further processed by ASIC 12 and ultimately decoded by microprocessor 42.

Video processing circuit 303 includes a preamplifier 308 for amplifying the photodetector output signal, a bandpass filter 310 for filtering out frequency extremes, threshold generator 311, and an analog-to-digital converter 312, for converting the filtered and thresholded analog signal to the digital signal VIDEO1 which can be further processed by ASIC 12 and decoded by microprocessor 42. While separate preamplifier circuits 302 and 308 are shown in FIG. 3, it will be recognized that a single preamplifier circuit which produces dual outputs with one output supplied to bandpass filter 304 and the other output supplied to bandpass filter 310 may also be suitably employed.

Bandpass filters 304 and 310 are chosen with different center frequencies, with the center frequency of bandpass filters 304 and 310 being preferably matched with the thresholds.

The signals, after being passed through bandpass filters 304 and 310, respectively, are compared with the thresholds generated by threshold generators 305 and 311. The thresholded signals are then passed to analog to digital (A/D) converters 306 and 312 which produce at their outputs the signal VIDEO0 and VIDEO1, respectively. The thresholds preferably contain both DC, or fixed, and AC, or time varying, components matched to their associated filters. By matching thresholds to frequency bands, much improved video processing can be performed under a variety of conditions. One purpose of the DC component is to reduce the effect of noise arising from a variety of sources. One purpose of the AC component is to track the filter signal level so that effects of imperfections in the label, such as voids in a printed dark bar, for example, are reduced. The AC component is adaptive, and its levels preferably follow or track the filtered signal level in a predetermined non-linear fashion. By way of example, where the filtered signal level is observed to be very high, the AC component of the threshold is increased to aggressively threshold out noises, bar code imperfections and the like. Where the filtered signal level is very low, the AC component may be reduced to zero and only the DC component is applied so that weak bar code interval signals are not filtered out. With a signal between very low and very high, an appropriate AC component is dynamically determined and applied. The signals VIDEO0 and VIDEO1 are converted to digital data strings VIDEO0DATA and VIDEO1 DATA by ASIC 12. These data strings are placed on the data bus and furnished to microprocessor 42. Microprocessor 42 decodes the highest-quality data string to recover the bar code information. If the bar code information is recovered, the scan is successful. If the bar code information is not recovered, microprocessor 42 signals the operator to repeat the scan.

If only one of the signals VIDEO0 and VIDE01 is passed through ASIC 12, only one digitally filtered signal is furnished to microprocessor 42, which then attempts to recover the bar code information. If the information is recovered, the scan is successful.

Figure 4:
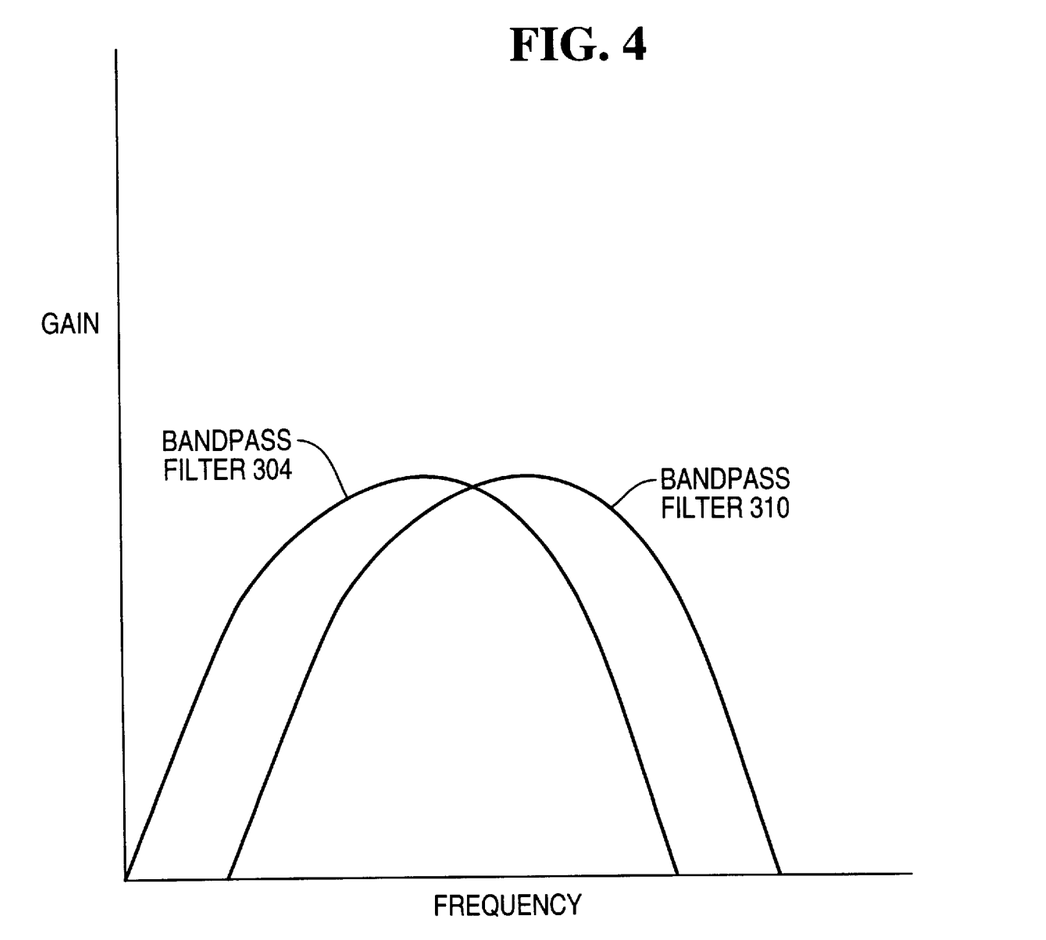
FIG. 4 is a graph of dual overlapping filtered video signals according to the present invention.

FIG. 4 is a graph showing the frequency response of the bandpass filters 304 and 310, respectively. The filtered signals overlap, and most scans will produce signals falling in the overlapping area. It can also be seen that the frequency responses of the filters extend well past the overlapping area, giving significantly greater coverage than if only one filter were used.

The use of two video processing circuits yields another advantage, which is that it provides redundant data. Whenever the signals from which the VIDEO0 and VIDEO1 signals are derived fall in the overlapping area shown in FIG. 4, the VIDEO0 signal is then converted to a digital data string, and the VIDEO1 signal is also converted to a digital data string by ASIC 12. Thus, two separate data strings are provided to microprocessor 42 for decoding. In the case of a poor-quality bar code, the data strings may have significantly different characteristics, such that one can be decoded while the other cannot. The existence of two data strings increases the likelihood that the scan will be successful and will not have to be repeated.

Figure 5:
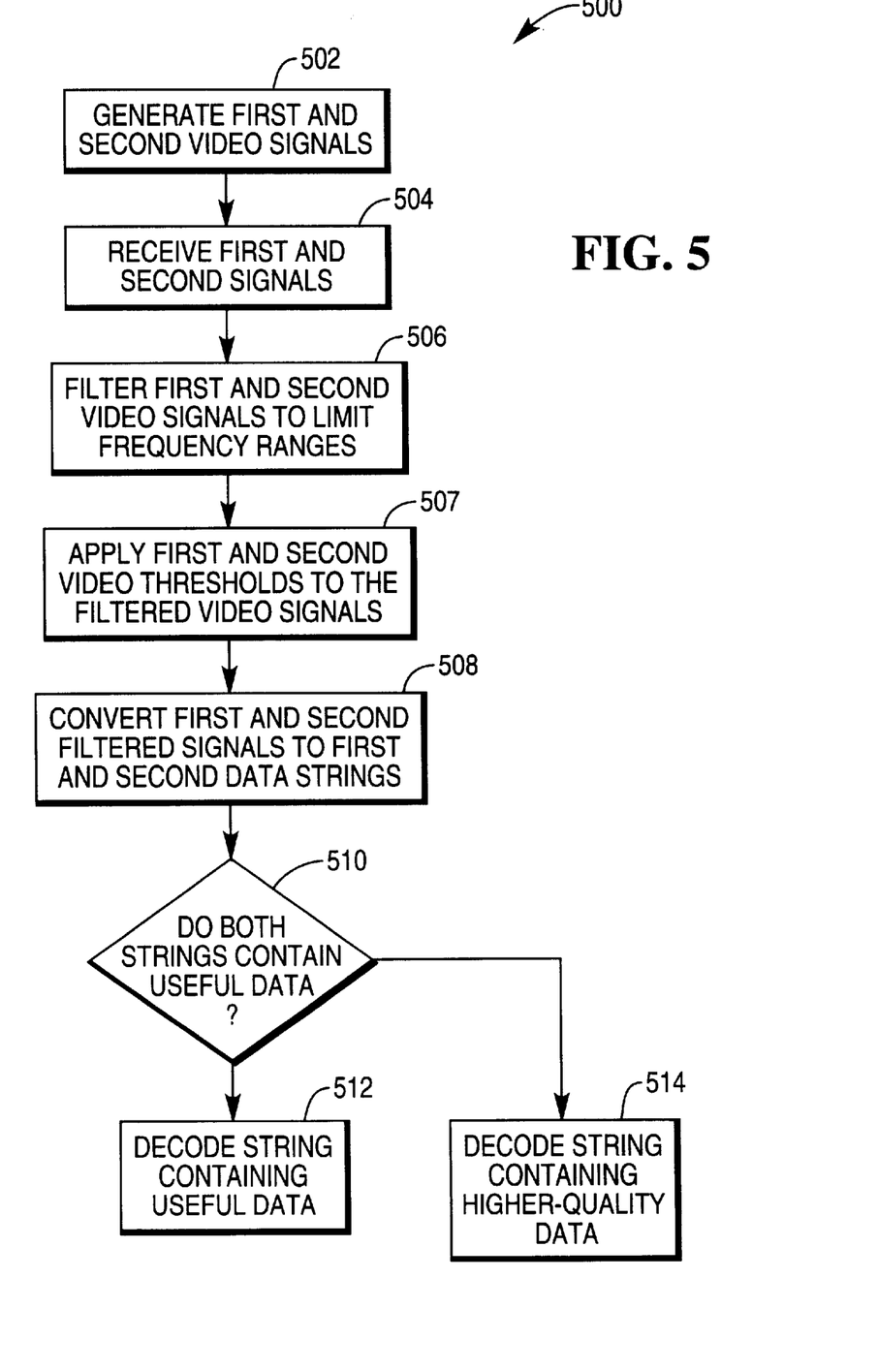
FIG. 5 is a flowchart illustrating the steps of a method of dual video channel data recovery according to the present invention.

FIG. 5 is a flowchart showing a method of bar code video data recovery 500 according to the teachings of the present invention. At step 502, first and second video signals are generated from a reflected bar code signal. At step 504, the first and second generated signals are received in video processing circuits, such as video processing circuits 301 and 303 of FIG. 3 and preferably amplified by a preamplifier. At step 506, the first and second video signals are filtered to limit the frequency range of each of the signals, thus producing first and second filtered video signals. The frequency ranges of the first and second filtered video signals are different but preferably overlapping. In step 507, first and second thresholds are generated and applied to the filtered signals. At step 508, the first and second thresholded video signals are converted to first and second digital data strings, respectively. At step 510, the first and second data strings are examined to determine if they both contain useful data. If one of the first and second video signals is outside the frequency range, the filtered video signal will not contain useful data. If both strings contain useful data, control is transferred to step 512 and the first or second data string is selected for decoding. The string selected for decoding is the string having the higher data quality. That is, the string suffering from the least data loss. Data loss may result from imperfections in the bar code from whose reflections the first and video signals were generated. If only one string contains useful data, control is transferred to step 514 and the string containing useful data is decoded. As a further aspect of the invention the thresholds applied in step 507 may be dynamically varied based upon observed scanning conditions. These scanning thresholds will preferably have both a DC and an AC component which are matched to the frequency bands of the first and second filters.

Figure 6:
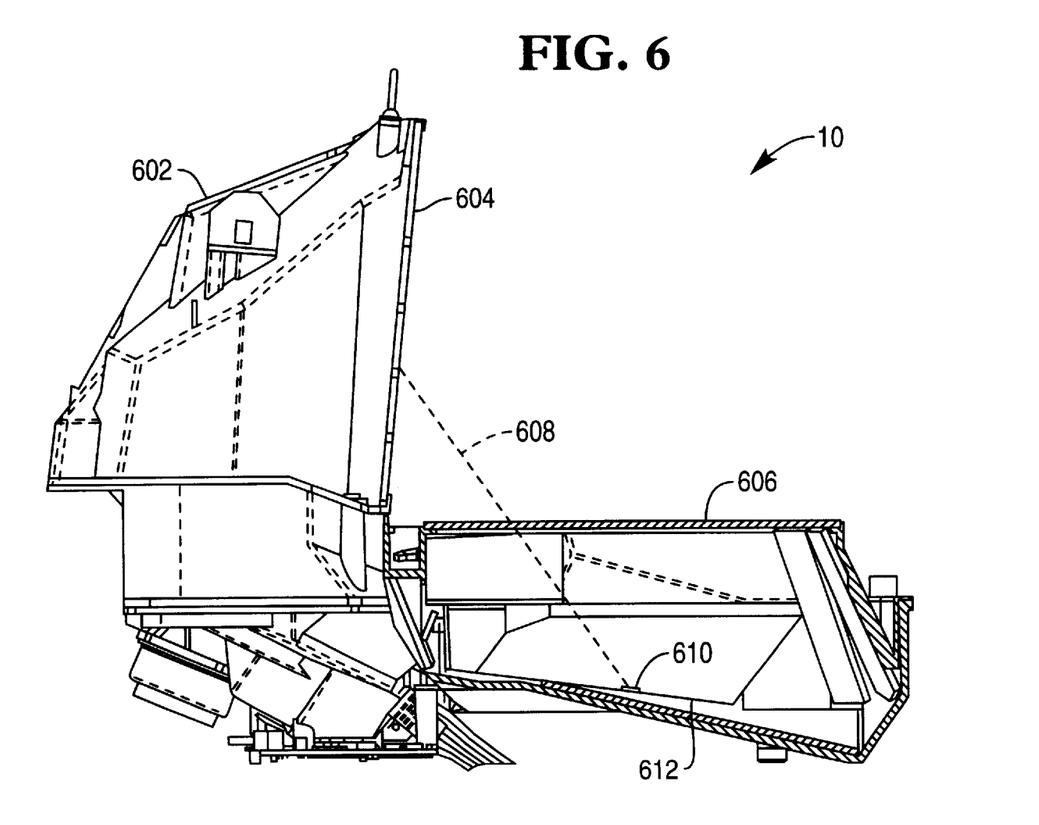
FIG. 6 illustrates a bar code scanner using a synchronization label to obtain an initial mirror position, and motor pulse data to update the mirror position, according to the present invention.

FIG. 6 is a cross-sectional view of the bar code scanner 10. Bar code scanner 10 is preferably a bioptic type scanner with top down read capability, such as the NCR model 7875 scanner. Bar code scanner 10 includes a housing 602 with a substantially vertical aperture 604 and a substantially horizontal aperture 606. The scanner 10 emits an array of scan lines from the vertical aperture 604, of which one line 608 is the focus of the present discussion. For the sake of simplicity, the remaining lines are not shown. Scan line 608 reenters the horizontal aperture 606 and strikes a synchronization label 610 located on the floor 612 of the bar code scanner 10. Being inside the sealed scanner 10, the label 610 is protected from the environment and is not subject to wear. Moreover, when items are inside the scan zone of vertical and horizontal apertures 604 and 606, these items will block the line of sight between laser 290 and syncronization label 610 if passed through this line. Thus, syncronization label 610 will not interfere with normal scanning.

While the present invention is disclosed in the context of a presently preferred embodiment, it will be recognized that a variety of implementations and alternatives exist consistent with the present teachings and the claims which follow below.

We claim:

1. A dual channel video data recovery system for use in a bar code scanner, comprising:
   a video signal generator for producing first and second video signals in response to light reflected from a bar code;
   a first video processing circuit for processing the first video signal, the first video processing circuit comprising:
      a first bandpass filter for filtering the first video signal, the first bandpass filter having a first center frequency and a first frequency range, the first bandpass filter producing a filtered video signal; and
      a first threshold generator for generating a first threshold;
   a second video processing circuit for processing the second video signal, the second video processing circuit comprising:
      a second bandpass filter for filtering the second video signal the second bandpass filter having a second center frequency different from the first center frequency and a second frequency range, the second bandpass filter producing a second filtered video signal; and
      a second threshold generator for generating a second threshold which is different from the first threshold;
   a circuit for converting the first and second thresholded video signals to a first and a second digital data string; and
   a data decoding circuit for decoding the first and second digital data strings to recover bar code data.

2. The data recovery system of claim 1, wherein the data decoding circuit is further operative to select the first or second data string for decoding when one of the first and second data strings includes more usable data than the other data string.

3. The data recovery system of claim 2, wherein the data decoding system includes a programmed microprocessor.

4. The data recovery system of claim 3, wherein the conversion circuit includes an analog to digital converter.

5. The data recovery system of claim 3 further comprising a bar code position sensing mechanism wherein the microprocessor is operable to determine bar code position and to utilize said position in selecting the first or second data string for decoding.

6. The data recovery system of claim 1 further comprising a bar code position sensing mechanism.

7. A dual channel video data recovery system for use in a bar code scanner, comprising:
   a video signal generator for producing first and second video signals in response to light reflected from a bar code;
   a first video processing circuit for processing the first video signal, the first video processing circuit comprising:
      a first bandpass filter for filtering the first video signal, the first bandpass filter having a first frequency range, the first bandpass filter producing a first filtered video signal; and
      a first threshold generator for generating a first threshold;
   a second video processing circuit for processing the second video signal, the second video processing circuit comprising:
      a second bandpass filter for filtering the second video signal, the second bandpass filter having a second frequency range, the second bandpass filter producing a second filtered video signal; and
      a second threshold generator for generating a second threshold which is different from the first threshold;
   a circuit for converting the first and second thresholded video signals to a first and a second digital data string; and
   a data decoding circuit for decoding the first and second digital data strings to recover bar code data,
   the data recovery system further comprising a scanner housing and a synchronizing bar code label precisely positioned inside said housing.

8. The data recovery system of claim 1 wherein the first and second threshold each include a DC and an AC component.

9. The data recovery system of claim 8 wherein said AC components are dynamically varied in response to bar code scanning conditions.

10. The data recovery system of claim 8 wherein said DC components are dynamically varied in response to bar code scanning conditions.

11. The data recovery system of claim 1 wherein the first threshold is more aggressive and the second threshold is less aggressive.

12. The system of claim 1 wherein the first and second center frequencies are matched to the first and second thresholds, respectively.

13. A method of data recovery for use in a bar code scanner, comprising the steps of:
   generating first and second video signals in response to light reflected from a bar code;
   processing the first and second video signals in first and second video processing circuits, respectively;
   filtering the first video signal with a first bandpass filter having a first center frequency to limit the first video signal to a first frequency range, and producing a first filtered video signal;
   applying a first threshold to the first video signal;
   filtering the second video signal with a second bandpass filter having a second center frequency different from the first center frequency to limit the second video signal to a second frequency range, the second frequency range differing from the first frequency range, and producing a second filtered video signal;
   applying a second threshold to the second video signal;
   converting the first filtered video signal to a first digital data string;
   converting the second filtered video signal to a second digital data string;
   selecting one of the first and second digital data stings for decoding, the selected data string being the higher-quality of the data strings; and
   decoding the selected data sting.

14. The method of claim 13 further comprising the step of: detecting bar code position.

15. The method of claim 14 further comprising the step of: utilizing a synchronizing bar code as part of said step of detecting bar code position.

16. The method of claim 15 further comprising the step of: utilizing the detected bar code position as one input in said step of selecting one of the first and second digital data strings for decoding.

17. The method of claim 13 wherein the first and second video signals each comprise DC and AC components.

18. The method of claim 17 wherein said DC components are different.

19. The method of claim 17 wherein said AC components are different.

20. The method of claim 17 further comprising the step of dynamically varying at least one of said first and second thresholds.

21. The method of claim 17 further comprising the steps of:
sensing a bar code scanning condition; and
dynamically varying at least one of said first and second thresholds in response to said sensed condition.

22. The method of claim 13 wherein the first threshold is a more aggressive threshold and the second threshold is a less aggressive threshold.

23. The method of claim 12 wherein the first and second center frequencies are matched to the first and second thresholds, respectively.

* * * * *